United States Patent [19]

Suzuki

[11] Patent Number: 4,900,598
[45] Date of Patent: Feb. 13, 1990

[54] INFORMATION STORAGE MEDIUM

[75] Inventor: Katsumi Suzuki, Tokyo, Japan

[73] Assignee: Kabushiki Kaisha Toshiba, Kawasaki, Japan

[21] Appl. No.: 240,202

[22] Filed: Sep. 6, 1988

[30] Foreign Application Priority Data

Sep. 22, 1987 [JP] Japan .................. 62-237787
Oct. 16, 1987 [JP] Japan .................. 62-261186

[51] Int. Cl.$^4$ .............................. B32B 3/02
[52] U.S. Cl. ........................ 428/64; 428/65;
428/76; 428/209; 428/457; 428/913; 369/288;
346/766; 346/135.1; 430/945
[58] Field of Search ............. 428/64, 65, 76, 209,
428/457, 913; 369/288; 346/76 L, 135.1;
430/945

[56] References Cited

U.S. PATENT DOCUMENTS

| | | | |
|---|---|---|---|
| 3,530,441 | 9/1970 | Ovshinsky | 340/173 |
| 4,565,772 | 1/1986 | Takeoka et al. | 430/945 |
| 4,647,944 | 3/1987 | Gravesteijn et al. | 346/1.1 |
| 4,668,573 | 5/1987 | Terao et al. | 428/336 |
| 4,702,991 | 10/1987 | Takeoka et al. | 430/935 |

FOREIGN PATENT DOCUMENTS 0121426 10/1984 European Pat. Off. .
0165440 10/1985 European Pat. Off. .
EP0184452A2 6/1986 European Pat. Off. .
2137740 6/1987 Japan .
2239339 10/1987 Japan .

OTHER PUBLICATIONS

CA 104 (16): 139382x, Funakoshi, 9-11-85.
CA 104(18): 159061y, Chiba 9-7-87.
S. R. Ovshinsky and H. Fritzsche; Reversible Structural Transformations in Amorphous Semiconductors for Memory and Logic; Metallurgical Transactions, vol. 2; Mar. 1971, pp. 641-645.

Primary Examiner—Ellis P. Robinson
Assistant Examiner—P. J. Ryan
Attorney, Agent, or Firm—Foley & Lardner, Schwartz, Jeffery, Schwaab, Mack, Blumenthal & Evans

[57] ABSTRACT

An optical disk comprises a polycarbonate substrate, a first protective layer, formed on the substrate and made of $SiO_2$, a recording layer, formed on the first protective layer and made of an In-Sb-Te alloy, a second protective layer, formed on the recording layer and made of $SiO_2$, and a surface protective layer, formed on the second protective layer and made of an ultraviolet curable resin. The recording layer has a composition of $In_{50-x}Sb_{50}Te_yAu_z$ wherein x, y, and z are in atomic %, $x=y+z$, $y \geq 2z$, and $1 \leq x \leq 6$), $In_{50-x}Sb_{50-x}Te_yAu_z$ (wherein $2x=y+z$ and $0<x \leq 10$), or $(In_{100-x}Sb_x)_{100-y-z}Te_yAu_z$ (wherein $48 \leq x \leq 52$ and $0.05 \leq y+z \leq 5$).

15 Claims, 3 Drawing Sheets

INFORMATION STORAGE MEDIUM

Background of the Invention

1. Field of the Invention

The present invention relates to an information storage medium such as an optical disk, wherein information can be recorded or erased therefrom information by way of a phase transformation of a recording layer of the disk, upon radiation of a light beam such as a laser beam.

2. Description of the Prior Art

A phase-transformation type optical disk is a typical example of an optical disk which permits information erasure. When a portion of a recording layer of a phase transformation-type optical disk is irradiated with a laser beam, that portion undergoes a phase transformation between a crystalline phase and an amorphous phase, depending on the conditions under which the laser beam is radiated, whereby information is either recorded thereon or erased therefrom.

Materials able to undergo such phase transformation include semiconductors, semiconductor compounds, and metal alloys (such as Te, Ge, TeGe, InSe, SbSe, and SbTe), such materials being able to be selectively placed in a crystalline state or an amorphous state. The complex indices of refraction of these materials, which is given by $N = n - ik$, differing considerably between one of these states and the other. The above two states can be alternately reversed by means of a heat treatment process employing a laser beam, thereby enabling information to be either recorded thereon or erased therefrom (S. R. Ovshinsky, Metallurgical Transactions 2, 641, 1971).

However, all of those materials (mentioned above) whose phase can be changed between amorphous and crystalline phases, thereby to enable the recording or erasure of information, have a low crystallization rate, as a result of which the respective periods of time required for initial crystallization and information erasure crystallization are undesirably long.

Besides the method described above, there exists a method wherein information is recorded and erased by way of reversible phase transformation between different crystalline phases, through changing the conditions under which a laser beam is radiated (Japanese Patent Disclosure (Kokai) No. Sho61-134944). A typical example of a material capable of undergoing reversible phase transformation is an In-Sb alloy.

Upon being irradiated by a low-power laser beam having a relatively long pulse, the grains of an In-Sb alloy thin film are converted into small-crystal grains. These small-crystal grains can be quickly grown into relatively large crystal grains upon radiation of a high-power laser beam having a short pulse. The complex indices of refraction of each of these two crystal structures differ considerably. When information is read from a recording layer, upon radiation of a laser beam thereinto, the crystal states are discriminated on the basis of a difference between amounts of light reflected by the recording layer.

Among the In-Sb systems, an $In_{50}Sb_{50}$ intermetallic compound has a high crystallization rate. However, it is difficult to actually record information for the reason that Sb segregation (described later) does not occur.

When the In content of the recording layer is higher than the Sb content, complete phase transformation cannot always be assured, with the result that recording of information is sometimes not possible.

When the Sb content of the recording layer is higher than the In content upon radiation of a laser beam thereinto, the recording layer is converted to a mixture phase of InSb intermetallic compound crystal grains and Sb crystal grains. The size of the Sb crystal grains changes in accordance with the conditions under which the laser beam is radiated, thus the information can be recorded.

However, since Sb has a low crystal growth rate, the recording layer initialization time and erase time are prolonged, thereby rendering high-speed operation impossible. More specifically, there is a tendency for initialization failure and incomplete erasure to occur. In the write mode, when the optical disk is rotated at high speed, crystal grains cannot grow sufficiently, thus resulting in unsatisfactory recording.

SUMMARY OF THE INVENTION

It is an object of the present invention to provide an information storage medium having good information storage properties and capable of initializing a recording layer and erasing information at high speed.

An information storage medium according the present invention comprises a substrate, and a recording layer which is supported on the substrate and subjected to reversible phase transformation between different phases by changing the conditions under which a light beam is radiated thereonto.

The recording layer contains an In-Sb-Te-Au four-element alloy having a composition of $In_{50-x}Sb_{50}Te_yAu_z$ (wherein x, y, and z are in atomic %, $x = y + z$, $y \geq 2z$, and $1 \leq x \leq 6$), $In_{50-x}Sb_{50-x}Te_yAu_z$ (wherein $2x = y + z$ and $0 < x \leq 10$), or $(In_{100-x}Sb_x)_{100-y-z}Te_yAu_z$ (wherein $48 \leq x \leq 52$ and $0.05 \leq y + z \leq 5$).

By changing the conditions under which the laser beam is irradiated thereonto, the $In_{50-x}Sb_{50}Te_yAu_z$ alloy undergoes a phase transformation between a mixed phase of InSb intermetallic compound small-crystal grains and $Sb_xTe_yAu_z$ crystal grains, and a mixed phase of InSb intermetallic compound small-crystal grains and amorphous $Sb_xTe_yAu_z$; the $In_{50-x}Sb_{50-x}Te_yAu_z$ alloy, on the other hand, undergoes a phase transformation between a mixed phase of InSb intermetallic compound small-crystal grains and $Te_yAu_z$ crystal grains, and a mixed phase of InSb intermetallic compound small-crystal grains and amorphous $Te_yAu_z$; and the $(In_{100-x}Sb_x)_{100-y-z}Te_yAu_z$ alloy undergoes a phase transformation between a mixed phase of InSb intermetallic compound small-crystal grains and a crystalline InTeAu or SbTeAu alloy, and a mixed phase of InSb intermetallic compound small-crystal grains and an amorphous InTeAu or SbTeAu alloy. When the composition of these alloys falls within the range defined by the present invention, the phase transformation speed of the InTeAu and SbTeAu alloys between crystalline and amorphous phases is very high, as a result of which information recording and erasure, vis-a-vis a recording layer, takes place at very high speed. Moreover, since the crystallization rate of the InSb intermetallic compound is itself very high, initial crystallization of the recording layer, which is conventionally in the amorphous phase when deposited, also occurs at very high speed.

Since an information recorded portion (to be referred to as a recording mark hereinafter) of recording layer contains chemically stable InSb intermetallic compound small-crystal grains, information stability is high, and the signal level (contrast between the recording mark and non-recorded portion) of the recorded information is very high due to the presence of Te and Au.

BRIEF DESCRIPTION OF THE DRAWINGS

A more complete appreciation of the invention and many of the attendant advantages thereof will be readily gained as the same become better understood by reference to the following detailed description, considered in connection with the accompanying drawings, of which.

DETAILED DESCRIPTION OF THE PREFERRED EMBODIMENT

The present invention will be described in detail hereinafter, with reference to a preferred embodiment.

Assume that a recording layer is formed as $In_{50-x}Sb_{50}Te_yAu_z$ alloy wherein $x=y+z$, $y \geq 2z$, and $1 \leq x \leq 6$. When this recording layer is irradiated with an optical beam, it undergoes a phase transformation between a mixed phase of InSb intermetallic compound small-crystal grains and $Sb_xTe_yAu_z$ crystal grains, and a mixed phase of InSb intermetallic compound small-crystal grains and amorphous $Sb_xTe_yAu_z$. Upon initialization or information erasure, the recording layer is set in a mixture phase of InSb intermetallic compound small-crystal grains and $Sb_xTe_yAu_z$ crystal grains, while, upon information recording, the recording layer is set in a mixture phase of InSb intermetallic small-crystal grains and amorphous $Sb_xTe_yAu_z$. In other words, since the $Sb_xTe_yAu_z$ alloy can become to two different phases of crystalline and amorphous phases, information can be read out by way of detecting the difference in reflectance between these two phases.

As described above, when the recording layer of the optical disk is made of an $In_xSb_{100-x}$ two-element alloy, and if x exceeds 50 atomic % or more, information recording becomes difficult. Consequently, the present inventors conducted an experiment in which the In of the InSb intermetallic compound was partially replaced by Te in order to improve the recording characteristics of the InSb alloy recording layer. As a result, it was found that when the recording layer had a composition of $In_{50-x}Sb_{50}Te_x$ wherein x, in atomic %, fell within a range of $0.5 < x \leq 5$, the recording layer could undergo phase transformation between different phases by being irradiated by an optical beam such as a laser beam. More specifically, when a short-pulsed laser beam having a relatively high output was radiated onto the recording layer, for information recording, the irradiated portion of the layer was set in a mixed phase of InSb intermetallic compound ($In_{50}Sb_{50}$) small-crystal grains and amorphous SbTe. On the other hand, when a long-pulsed laser beam having a relatively low output was radiated onto the recording layer, for erasure or initialization, the irradiated portion was set in a mixed phase of InSb intermetallic compound small-crystal grains and equilibrated SbTe crystal grains. Meanwhile, an InSb intermetallic compound has a very high crystallization rate. The present inventor measured the crystallization time of an amorphous InSb intermetallic compound by using a static evaluation apparatus. In this operation, the power of a laser beam was fixed at 9 mW and the pulse width was varied. When laser beams were radiated onto the InSb intermetallic compound changing the pulse width, it was changed a crystalline state with irradiated laser beam of about 15 nsec pulse width as a minimum value. When pure Te was used to form a recording layer and when measurement was performed using a static evaluation apparatus, the crystallization rate was very as high as 50 nsec at minimum. In contrast to this, the crystallization rate of the SbTe alloy is about 1 μsec, which is somewhat low, as is made clear in the above publication. If the Te content of the three-element alloy described above is small, the crystallization rate is high, and thus the laser beam radiation time required for crystallization is short. However, if the Te content of the alloy is increased, the crystallization rate of the SbTe alloy becomes lower, which results in the laser beam radiation time required for crystallization being prolonged. In other words, the greater the Te content, the longer the erase time. In the $In_{50-x}Sb_{50}Te_x$ three-element alloy, it is the SbTe alloy, and not the InSb intermetallic compound, which contributes to information recording. Therefore, the level of a reproduction signal cannot be increased unless a certain amount of Te is contained in the recording layer. More precisely, since the SbTe alloy undergoes phase transformation between a crystalline state and an amorphous state, the difference in intensity of the reflected light between the two states is large and the level of a reproduction signal becomes high. In contrast, since the intensity of the reflected light of the InSb intermetallic compound between the crystalline state and the amorphous state is very small, the InSb intermetallic compound does not contribute to information recording. Therefore, when a recording layer is to be formed using the three-element alloy for effective information recording, it is unavoidable to lower the crystallization rate to a certain degree.

Table 1 shows a crystallization time upon laser beam radiation and a change in reflectance (relative value) between a recorded and erased portions obtained by using a static evaluation apparatus when the Te content of the InSbTe three-element alloy is changed.

TABLE 1

| Composition | Minimum Crystallization Time (nsec) | Contrast (%) |
|---|---|---|
| $In_{49}Sb_{50}Te_1$ | 30 | 1 |
| $In_{48}Sb_{50}Te_2$ | 60 | 5 |
| $In_{47}Sb_{50}Te_3$ | 80 | 8 |
| $In_{46}Sb_{50}Te_4$ | 120 | 12 |
| $In_{45}Sb_{50}Te_5$ | 300 | 15 |

From Table 1, it is found that when the Te content is 5 atomic % or less, the crystallization time is shorter than at least 1/10 that (2 to 3 μsec) of $In_{45}Sb_{55}$, thus providing a relatively high crystallization rate.

However, along with the development of the recent high-density, high-speed optical disk, a high contrast in the recorded portion and a high erasure speed (the laser beam radiation time is as short as 100 nsec or less) have been demanded. Therefore, when an $In_{50-x}Sb_{50}Te_x$ alloy is used as a material of the recording layer, a composition satisfying both requirements of a high contrast and a high erase speed inevitably falls within a very narrow range.

In contrast to this, regarding the recording layer having a composition falling within the range of the present invention, even when the disk is rotated at a very high speed, crystallization can be performed very quickly, and good initialization and erasure characteristics can be obtained. Also, a sufficiently high contrast can be obtained between a recording mark and a non-recorded portion.

The reason why addition of a small amount of Au to the InSeTe alloy shortens the crystallization time can be attributed to the following facts. More specifically, when Au is added to the InSbTe alloy, the chain structure of Te formed by increasing the Te amount in the alloy is disconnected by the $AuTe_2$ bonds. When the Te content is increased, the crystallization rate of SbTe is decreased due to the Te chain structure. On the other hand, when Te is partially replaced by Au, the Te chain structure is disconnected to increase the crystallization rate. In this case, when the total amount of Te and Au is less than 1 atomic %, the contrast between the recording mark and the non-recorded portion becomes excessively small; when the total amount exceeds 6 atomic %, the crystallization rate is decreased. Therefore, the total amount of Te and Au is set to fall within the range of 1 to 6 atomic %. When the Te content is less than twice the Au content, the contrast becomes excessively small Therefore, the Te content is set to be at least twice the Au content.

Assuming that the recording layer is made of an $In_{50-x}Sb_{50-x}Te_yAu_z$ alloy wherein $2x=y+z$ and $0<x\leq10$, upon radiation of an optical beam, the recording layer undergoes a phase transformation between a mixed phase of InSb intermetallic compound small-crystal grains and $Te_yAu_z$ crystal grains and a mixed phase of InSb intermetallic compound small-crystal grains and amorphous $Te_yAu_z$ depending on the conditions under which the optical beam is radiated. In initialization and information erasure, the recording layer is set in a mixture phase of InSb intermetallic compound small-crystal grains and $Te_yAu_z$ crystal grains. In information recording, the recording mark is set in a mixed phase of InSb intermetallic compound small-crystal grains and amorphous $Te_yAu_z$. Namely, since $Te_yAu_z$ is set in two different phases of crystalline and amorphous phases, information can be read out from a difference in reflectance between these two phases. In this case, an information recording/erasure mechanism is similar to that of a case of an InSb alloy containing an excessive amount of Sb. However, $Te_yAu_z$ is easily set in the amorphous phase upon radiation of a high-power, short-pulse width optical beam, and is crystallized very quickly upon radiation of a small-power, long-pulse width optical beam. Furthermore, the InSb intermetallic compound has a very high crystallization rate. Therefore, when the recording layer has the above-described composition, initialization and information recording/erasure can be performed at very high speed. As a result, particularly in initialization and information erasure, incomplete initialization and erasure can be decreased to a considerable extent.

Au is supposed to have a function to disconnect the Te chain structure, as described above. Therefore, even when the disk is rotated at a very high speed of 1,500 to 1,800 rpm, the TeAu alloy can be transformed from the amorphous to crystalline phase at a high speed.

In this case, when $x<10$, the reproduction signal level of the recorded information becomes low. Therefore, x is set to satisfy $0<x\leq10$.

Assume that a recording layer is formed of an $(In_{100-x}Sb_x)_{100-y-z}Te_yAu_z$ alloy wherein $48\leq x\leq 52$ and $0.05\leq y+z\leq 5$. When the recording layer is irradiated with an optical beam, it undergoes a phase transformation between a mixed phase of InSb intermetallic compound small-crystal grains and InTeAu or SbTeAu small-crystal grains and a mixed phase of amorphous InTeAu or SbTeAu and InSb intermetallic compound small-crystal grains depending on the conditions under which the optical beam is radiated. Upon initialization or information erasure, the recording layer is set in a mixed phase of InSb intermetallic compound small-crystal grains and InTeAu or SbTeAu small-crystal grains. Upon information recording, the recording mark is set in a mixed phase of amorphous InTeAu or SbTeAu and InSb intermetallic compound small-crystal grains.

In this case as well, the InTeAu or SbTeAu crystallization rate is very high because of the function of Au to disconnect the amorphous Te chain structure described above. Thus, even when the disk is rotated at a very high speed, the initialization and information erasure can be performed at a very high speed. When the recording layer is made of the alloy having the above-described composition, the disk can be easily manufactured since In and Sb contents have certain margins. When x falls outside the range of $48\leq x\leq 52$, the basic InSb crystallization rate becomes very low and it is disadvantageous. Thus, x is set to satisfy $48\leq x\leq 52$. When Te and Au contents are set such that their total amount is 0.05% or more, the contrast between the recording mark and the non-recorded portion can be increased. However, when the total amount exceeds 5%, the crystallization rate is considerably decreased. Therefore, y and z are set to satisfy $0.05\leq y+z\leq 5$.

With any of the compositions described above, InSb intermetallic compound small-crystal grains having a high chemical stability are contained in the recording mark. Therefore, recorded information has a high stability.

Figure 1:
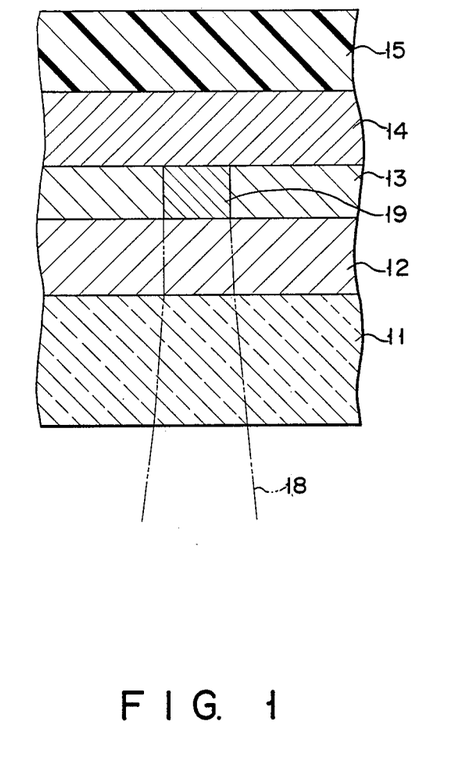
FIG. 1 is a sectional view of an information storage medium (optical disk) according to an embodiment of the present invention.

An information storage medium (optical disk) of this embodiment has an arrangement as shown in FIG. 1. Substrate 11 is made of a transparent material, e.g., glass or polycarbonate resin, whose deterioration over time is small. A groove is formed in substrate 11. Protective layer 12, recording layer 13, and protective layers 14 and 15 are formed on substrate 11 in this order. Protective layers 12 and 14 contain a dielectric material. In the preferred embodiment being described layers 12 and 14 are made of $SiO_2$ to prevent, layer 13 from being melted to form a hole. In the preferred embodiment being described layer 15 is made of an ultraviolet curable resin and has a function to prevent the upper surface of the disk from being damaged. Layer 13 is made of the $In_{50-x}Sb_{50}Te_yAu_z$ alloy ($x=y+z$, $y<2z$, $1\leq x\leq 6$), the $In_{50-x}Sb_{50-x}Te_yAu_z$ alloy ($2x=y+z$, $0<x\leq 10$), or the $(In_{100-x}Sb_x)_{100-y-z}Te_yAu_z$ alloy ($48\leq x'52$), $0.05\leq y+z\leq 5$) described above. Layer 13 undergoes a phase transformation described above depending on the conditions under which the optical beam is radiated.

While it is preferable to form protective layers 12, 14, and 15, they may be omitted.

A method of fabricating the information storage medium (optical disk) of this embodiment will now be described in detail, with reference to FIGS. 2 and 3.

Figure 2:
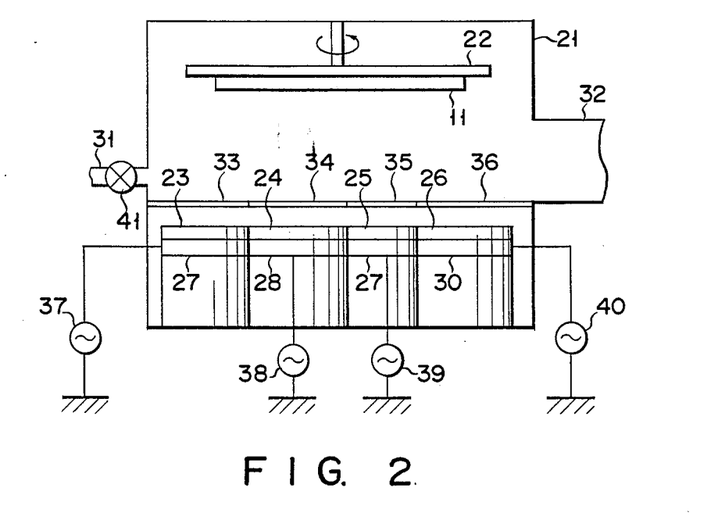
FIG. 2 is a schematic view showing a sputtering apparatus used in the fabrication of the information storage medium (optical disk) shown in FIG. 1.
Figure 3:
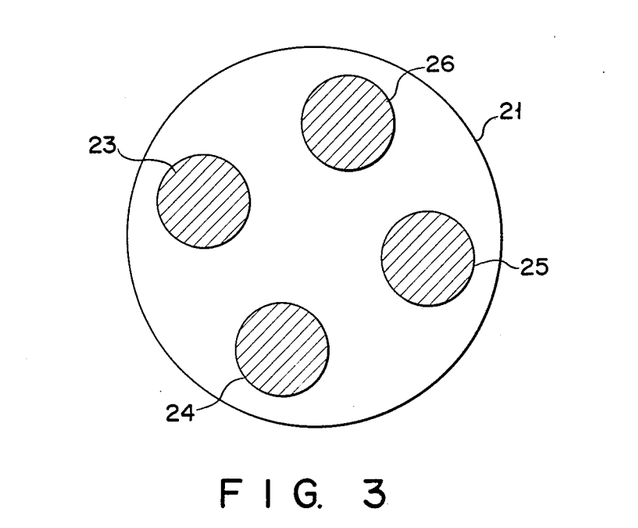
FIG. 3 is a plane view of the sputtering apparatus.

FIG. 2 is a schematic view of a sputtering apparatus for forming the recording layer, and FIG. 3 is a plane view of the apparatus.

Reference numeral 21 denotes a cylindrical reaction chamber with exhaust port 30 and gas inlet port 31 formed in its wall. A cryopump is connected to exhaust port 32, for evacuating chamber 21. An argon supply device (not shown) is connected to gas inlet port 31, for supplying argon gas to chamber 21, through gas inlet port 31. Disk-like substrate 11 is horizontally supported by rotary base 22 in the upper portion of reaction chamber 21. When rotary base 22 is rotated by a motor (not shown), substrate 11 is rotated therewith. Plate electrodes 27, 28, 29, and 30 are arranged such that they oppose substrate 11 in chamber 21. Electrodes 27, 28, 29, and 30 are connected to RF (Radio Frequency) power sources 37, 38, 39 and 40, respectively. In-Sb alloy target 23, having a predetermined composition, $SiO_2$ target 24, Te target 25 and Au target 26 are placed on electrodes 27, 28, 29 and 30, respectively. Shutters 33, 34, 35 and 36 are arranged between respective targets 23, 24, 25 and 26 and substrate In order to perform sputtering, using the sputtering apparatus having the above arrangement, reaction chamber 21 is first evacuated by the cryopump to a vacuum of $10^{-6}$ Thereafter argon gas is supplied to chamber 21 at a flow rate of, for example, 10 SCCM, to adjust the gas pressure (e.g., 5 mTorr) terein. RF power of, for example, 200 W is supplied from RF power source 38 to $SiO_2$ target 24 while substrate 11 is being rotated at 60 rpm, to form protective layer 12 thereon. In this case, only shutter 34 is kept open. Subsequently, shutter 34 is closed and shutters 33, 35 and 36 are opened. At the same time, RF power of, for example, 200 W is supplied from RF power source 37 to target 23, with 20 W being supplied from RF power sources 39 and 40 to targets 25 and 26 respectively, thereby to form recording layer 13 of an InSbTeAu alloy having a predetermined composition. RF power sources 37, 39 and 40 are then deenergized, while RF power source 38 is energized once again. Protective film 14 is formed on recording layer 13 under the same conditions as in the case of protective film 12.

When a recording layer is to be formed, a target having the same composition as that of the recording layer to be formed can be formed. Alternatively, In, Sb, Te, and Au targets can be used to perform four-element co-sputtering.

A sample thus prepared is removed from reaction chamber 21, and an ultraviolet curable resin is spin-coated on the sample. The resin is cured with ultraviolet rays, thereby forming protective layer 15.

The operation of the information storage medium (optical disk) of this embodiment will now be described below.

Initialization

Recording layer 13 is amorphous immediately after it is formed. Therefore, a laser beam having a relatively low power and a long pulse width is continuously radiated onto layer 13 to melt it. Then, layer 13 is gradually cooled to solidify so that it undergoes a phase transformation to a mixed phase of InSb intermetallic compound small-crystal grains and SbTeAu, InTeAu, or TeAu crystal grains.

Recording

Laser beam 18 having a relatively high power and a short pulse width is radiated onto initialized layer 13 to melt it. Then, layer 13 is quickly cooled so that the irradiated portion is transformed to a mixed phase of InSb intermetallic compound small-crystal grains and amorphous InTeAu, InTeAu, or TeAu, thereby forming recording mark 19.

Reading

A laser beam having a relatively low power is radiated onto recording layer 13 to detect the intensity of light reflected by layer 13, thereby reading information.

Erasure

A laser beam is radiated onto recording mark 19 under the conditions substantially the same as those for initialization. Mark 19 is melted and gradually cooled to solidify in the same manner as in initialization, and is returned to a mixed phase of InSb intermetallic compound small-crystal grains and SbTeAu, InTeAu, or TeAu crystal grains. As a result, information is erased.

Figure 4:
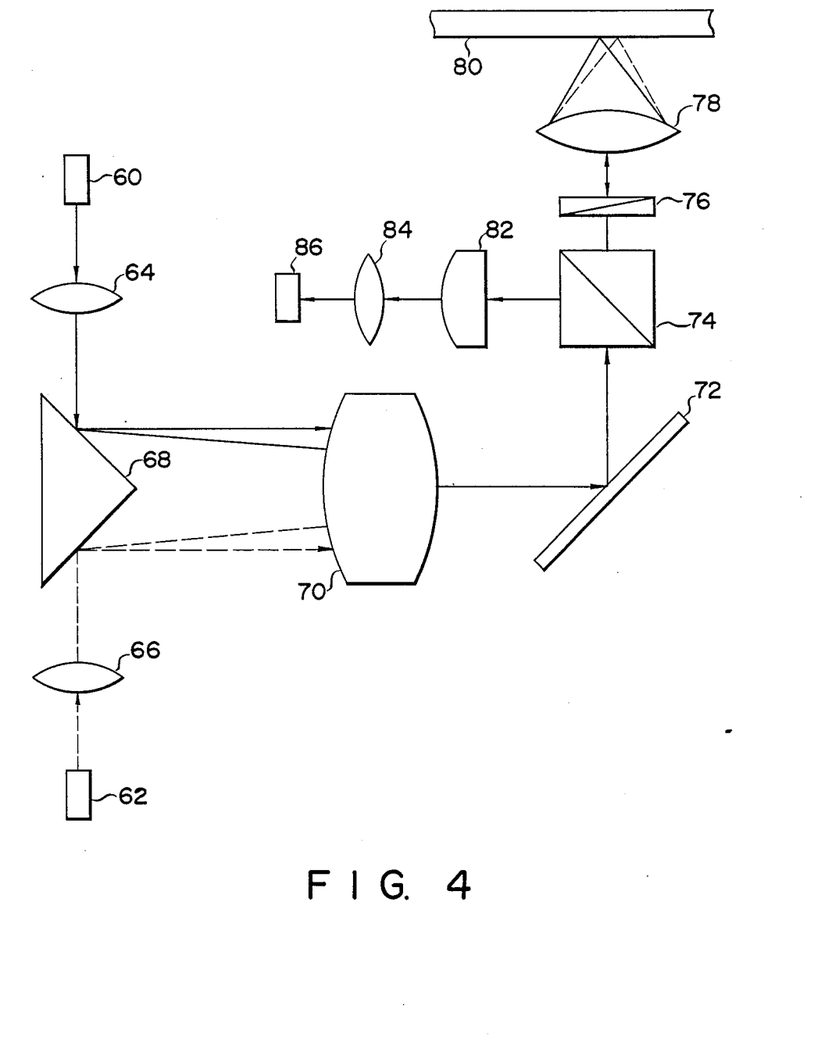
FIG. 4 is a schematic view showing an optical system for recording information in the information storage medium (FIG. 1) or reading out or erasing it therefrom.

Referring now to FIG. 4, a control optical system, which is used to record, erase, or read information on or from the information storage medium (optical disk) according to this embodiment, will be described in detail.

The optical system comprises semiconductor laser diode 60 for recording and reading information and semiconductor laser diode 62 for erasing information recorded on the optical disk. A laser beam emitted from diode 60 or 62 is focused by lens 64 or 66, and reflected by mirror 68. The reflected light from mirror 68 enters lens 70 in parallel relation to the optical axis, and is then reflected by mirror 72. The reflected laser beam from mirror 72 is introduced into beam splitter 74 and then into polarizing plate 76, whose thickness is equal to about one quarter of the wavelength of the applied laser beam. Then, the laser beam enters lens 78 and is focused thereby on optical disk 80. Lens 78 is movably supported by a drive mechanism (not shown), which serves to adjust the position of lens 78 radially and axially. Disk 80 is rotated at a speed of 10 m/s.

The reflected light from optical disk 80 enters lens 78 again and passes through plate 76. At this time, the light is polarized as it moves back and forth within plate 76, so that it is reflected by beam splitter 74 and deflected toward converging lens 82 and column lens 84. The reflected light from optical disk 80 is detected by detector 86. Lens 78 is moved by the drive mechanism so that the converged spot from lens 78 focuses on disk 80.

In recording information, a pulsating light beam (recording beam) corresponding to the information to be recorded is emitted from laser diode 60. The recording beam is applied to a predetermined portion of the recording layer of optical disk 80. The irradiated portion develops into a recording mark after undergoing the aforementioned phase transformation.

In reading information, a laser beam with an output one-tenth that of the recording beam is emitted continuously from laser diode 60. This laser beam passes through the substrate of optical disk 80, and is reflected by the recording layer. Detector 86 detects the intensity of the reflected light from the recording layer. In this case, the recording mark and the other portion of the recording layer are different in crystal grain size, as mentioned before, so that reflected light beams from these different portions are different in intensity. Thus, based on the difference in intensity between the reflected beams, the recorded information can be read securely.

In erasing information, an erasing laser beam is emitted continuously from laser diode 62 to be applied to the recording mark. Thereupon, the recording mark undergoes phase transformation such that it changes back into a fine crystal resembling the other portion, in the manner as aforesaid. As a result, the information is erased.

Examples of characteristic tests on information storage media manufactured according to the present invention will now be described.

EXAMPLE 1

An $SiO_2$ layer was formed on a grooved polycarbonate substrate with the argon sputtering apparatus shown in FIG. 2, and an $In_{50-x}Sb_{50}Te_yAu_z$ four-element alloy film was formed thereon by four-element co-sputtering to form a recording layer. Another $SiO_2$ layer was formed on the recording layer. Then, an ultraviolet curing resin film was formed on the $SiO_2$ layer, thereby forming an optical disk. In this case, the composition of recording layer 13 was changed and the minimum crystallization time and the contrast between the recording mark and the non-recorded portion were measured with a static evaluation apparatus as described above. Table 2 shows the results.

TABLE 2

| Composition of InSbTeAu (at %) | | | | Minimum Crystallization Time (nsec) | Contrast Between Recording Mark and Non-recorded Portion (%) |
|---|---|---|---|---|---|
| In | Sb | Te | Au | | |
| 47 | 50 | 2 | 1 | 30 | 6 |
| 46 | 50 | 3 | 1 | 30 | 6 |
| 46 | 50 | 2 | 2 | 50 | 7 |
| 46 | 50 | 1 | 3 | 200 | 4 |
| 45 | 50 | 4 | 1 | 50 | 8 |
| 45 | 50 | 3.5 | 1.5 | 50 | 8 |
| 45 | 50 | 3 | 2 | 200 | 5 |
| 45 | 50 | 1 | 4 | 300 | 2 |
| 44 | 50 | 5 | 1 | 60 | 10 |
| 44 | 50 | 4 | 2 | 70 | 10 |
| 44 | 50 | 3 | 3 | 80 | 10 |
| 44 | 50 | 2 | 4 | 300 | 5 |
| 44 | 50 | 1 | 5 | 400 | 5 |
| 43 | 50 | 6 | 1 | 120 | 12 |
| 43 | 50 | 5 | 2 | 150 | 15 |
| 44 | 50 | 4 | 3 | 300 | 15 |
| 44 | 50 | 3 | 4 | 400 | 10 |
| 44 | 50 | 2 | 5 | 800 | 10 |
| 44 | 50 | 1 | 6 | 1000 | 8 |

From Table 2, the following facts are obtained. When the recording layer is set to have a composition falling within the range of the present invention, the minimum crystallization time is as short as less than 100 nsec and the contrast is large. When the total amount of Te and Au is 7 atomic %, the minimum crystallization time is excessively prolonged. When the total amount of Te and Au is 6 atomic % or less, if the Te content is smaller than twice the Au content, the contrast is degraded and the crystallization time is prolonged. From these results, the effectiveness of forming the recording layer with the $In_{50-x}Sb_{50}Te_yAu_z$ alloy ($x=y+z$, $y \geq 2z$, $1 \leq x \leq 6$) was confirmed.

EXAMPLE 2

The sample obtained in Example 1 was subjected to a test by a dynamic characteristic evaluation device. First, in order to initialize the sample in form as deposited, the laser beam power was fixed at 10 mW and the rotational frequency of the disk was changed in a range of 1,000 to 1,800 rpm. The laser beam was continuously emitted while the disk was rotated. Regarding recording layers having a composition of $In_{50-x}Sb_{50}Te_yAu_z$, when $x=y+z$ and x is 7 atomic % or more, in order to perform initialization, the same portion of the recording layer needed continuous laser beam radiation while the disk was rotated 4 or 5 times. However, when $1 \leq x \leq 6$ atomic %, in order to perform initial crystallization, even if the rotational frequency was 1,800 rpm, the same portion of the recording layer needed laser beam radiation while the disk was rotated 1 to 3 times.

Subsequently, the rotational frequency of the disk was set at 1,400 rpm, and a pulsated laser beam having a power of 15 mW and a pulse width of 100 nsec was radiated onto the initialized portion of the sample disk to record information. As a result, an AC reproduction signal was obtained irrespective of the x value. However, when x is 7 atomic %, the amplitude of the reproduction signal was small.

In order to perform information erasure, a laser beam having a power of 10 mW was continuously radiated onto the information recorded portion in the same manner as in initialization. As a result, when $1 \leq x \leq 6$ atomic %, the information was erased substantially completely. However, when x was 7 atomic %, incomplete erasure of a level about ¼ the AC reproduction signal was found.

EXAMPLE 3

A 1,000-Å thick $SiO_2$ layer was formed on a grooved polycarbonate substrate with the apparatus shown in FIG. 2 in the same manner as in Example 1, and an 800-Å thick $In_{44}Sb_{44}Te_8Au_4$ four-element alloy film was formed thereon by four-element simultaneous sputtering to form a recording layer. Another 1,000-Å thick $SiO_2$ layer was formed on the recording layer. Then, a 10-μm thick ultraviolet curing resin film as formed on the $SiO_2$ layer, thereby forming an optical disk as sample A. In this case, the composition of the $In_{44}Sb_{44}Te_8Au_4$ alloy recording layer was strictly adjusted by InSb, Te, and Au simultaneous sputtering since it is the most important point of Example 3. Following the same procedures as for sample A except that a recording layer consisted of an $In_{43}Sb_{57}$ alloy, sample B was prepared. The dynamic characteristics of samples A and B were evaluated using a dynamic characteristic evaluation device. In evaluation, a laser beam with a wavelength of 830 nm was used. For initialization, a laser beam with a power of 8 mW was continuously radiated. For recording, a laser beam with a power of 10 mW, a pulse width of 200 nsec, and a duty ratio of 50% was pulse-radiated. For erasure, a laser beam with the same power as that used for initialization was continuously radiated. Table 3 shows the results.

TABLE 3

| | Rotational Frequency (rpm) | Number of Initialization Rotations (times) | Reproduction Signal of Recording Mark (mV) | Incomplete Erasure (mV) |
|---|---|---|---|---|
| Sample A | 200 | 1 | 120 | 0 |
| | 400 | 1 | 120 | 0 |
| | 800 | 1 | 120 | 0 |
| | 1,500 | 2 | 100 | 10 |
| | 1,800 | 3 | 80 | |
| Sample | 200 | 1 | 150 | 0 |

TABLE 3-continued

| | Rotational Frequency (rpm) | Number of Initialization Rotations (times) | Reproduction Signal of Recording Mark (mV) | Incomplete Erasure (mV) |
|---|---|---|---|---|
| B | 400 | 3 | 120 | 10 |
| | 800 | 6 | 70 | 50 |
| | 1,500 | Cannot be Initialized | — | — |
| | 1,800 | Cannot be Initialized | — | — |

The rotational frequency of the disk was set at 400, 800, 1,500, and 1,800 rpm. In Table 1, the number of initialization rotations indicates the number of rotations of the disk required for crystallizing a single track, and the reproduction signal of recording mark indicates the amplitude of an AC signal with respect to the DC component in reproduction of the recorded portion. In the column of the incomplete erasure, the level of remaining AC signals after the laser beam is radiated onto the recording mark for erasure is shown.

As a result, it is found that sample A requires a smaller number of initialization rotations and has a lower unerased signal level than those of sample B. This tendency is conspicuous as the rotational frequency of the disk is increased. In particular, when the rotational frequency of the disk was set at 1,500 rpm, sample A was initialized whereas sample B was not initialized at all. Namely, when the recording layer had such a composition that Sb segregation of a conventional InSb recording layer was replaced by $Te_yAu_z$, it was confirmed that the initialization and erasure characteristics were improved. Regarding the recording characteristics, sample A is superior to sample B. More specifically, even when the rotational frequency of the disk of sample A is increased, the degradation in reproduction signal level is small, whereas in sample B as the rotational frequency of the disk is increased, the reproduction signal level is greatly degraded. In other words, when the rotational frequency of sample B is increased, crystal growth of Sb upon laser beam radiation becomes insufficient. In contrast this, even when the rotational frequency of sample A is increased, the $Te_yAu_z$ alloy is quickly transformed to the amorphous phase.

EXAMPLE 4

Optical disk samples having layer structures similar to that of Example 1 were prepared by forming recording layers using $In_{50-x}Sb_{50-x}Te_yAu_z$ alloys and changing the values of x, y, and z. The obtained disks were subjected to dynamic characteristic evaluation. Table 4 shows the result. The value of 2x was set at 10, 15, 20, or 30 atomic %. Accordingly, the value of y was set to fall within the ranges of $5 \leq y \leq 9$, $8 \leq y \leq 14$, $10 \leq y \leq 19$, or $15 \leq y \leq 29$. The rotational frequency of the disk was set at 1,500 rpm. Under this conditions, the initialization, recording, and erasure characteristics were evaluated.

TABLE 4

| Value of 2x | Value of y | Value of z | Initialization Characteristics | Recording Characteristics | Erasure Characteristics |
|---|---|---|---|---|---|
| 10 | 5 | 5 | o | o | o |
| | 7 | 3 | o | o | o |
| | 9 | 1 | o | o | o |
| 15 | 8 | 7 | Δ | o | o |
| | 10 | 5 | o | o | o |
| | 12 | 3 | o | o | o |
| | 14 | 1 | o | o | o |
| 20 | 10 | 10 | o | Δ | o |
| | 12 | 8 | Δ | Δ | o |
| | 14 | 7 | Δ | o | o |
| | 16 | 4 | Δ | o | Δ |
| | 19 | 1 | Δ | o | Δ |
| 30 | 15 | 15 | x | Δ | x |
| | 17 | 13 | x | Δ | x |
| | 19 | 11 | x | Δ | x |
| | 21 | 9 | x | Δ | x |
| | 23 | 7 | x | Δ | x |
| | 25 | 5 | x | Δ | x |
| | 29 | 1 | x | Δ | x |

It must be noted that o indicates that the corresponding characteristics are good; x, that the corresponding characteristics are of the conventional level; and Δ, that the corresponding characteristics are of the level between good and conventional levels. It was confirmed from Table 4 that initialization, recording, and erasure characteristics were good when 2x was less than 20, i.e., x was less than 10.

EXAMPLE 5

A disk sample similar to those of Examples 1 and 3 except that a recording layer was formed using an $(In_{48}Sb_{52})_{96}Te_3Au_1$ alloy was prepared and subjected to static characteristic evaluation. The amorphous recording layer in form as deposited was irradiated with a pulsated laser beam having a power of 9 mW. The pulse width required for crystallization of the beam irradiated portion was measured. In this sample, the pulse width for crystallization was 65 nsec. $In_{45}Sb_{55}$ requires 2 to 3 μsec for crystallization. Therefore, it was confirmed that $In_{45}Sb_{55}$ considerably increased the crystallization rate of the recording layer of this sample.

This sample was subjected to dynamic characteristic evaluation under the same conditions as in Example 2. As a result, even when the sample was rotated at a very high speed of 1,800 rpm, upon radiation of the laser beam onto the same portion of the disk while the disk is rotated 1 to 3 turns, the irradiated portion underwent a phase transformation from an amorphous to crystalline phase. Regarding the $(In_{100-x}Sb_x)_{100-y-z}Te_yAu_z$ alloy, samples satisfying $48 \leq x \leq 52$ and $0.05 \leq y+z \leq 5$ both exhibited good dynamic characteristics as the $(In_{48}Sb_{52})_{96}Te_3Au_1$ alloy.

What is claimed is:

1. An information storage medium comprising:
   a substrate; and
   a recording layer supported on said substrate and subjected to reversible phase transformation between different phases by changing conditions under which a light beam is radiated, said recording layer containing an $In_{50-x}Sb_{50}Te_yAu_z$ alloy (wherein x, y, and z are in atomic %, x=y+z, y $\geq$ 2z, and $1 \leq x \leq 6$).

2. A medium according to claim 1, further comprising a first protective layer, interposed between said substrate and said recording layer.

3. A medium according to claim 2, further comprising a second protective layer, disposed on said recording layer.

4. A medium according to claim 3, further comprising a surface layer disposed on said second protective layer.

5. A medium according to claim 3 wherein said first and second protective layers contain a dielectric material.

6. A medium according to claim 4, wherein said surface layer contains a resin.

7. An information storage medium comprising:
a substrate; and
a recording layer supported on said substrate and subjected to reversible phase transformation between different phases by changing conditions under which a light beam is radiated, said recording layer containing an $In_{50-x}Sb_{50-x}Te_yAu_z$ alloy (wherein x, y, and z are in atomic %, $2x = y + z$, and $0 < x \leq 10$).

8. A medium according to claim 7, further comprising a first protective layer, interposed between said substrate and said recording layer.

9. A medium according to claim 8, further comprising a second protective layer, disposed on said recording layer.

10. A medium according to claim 9, further comprising a surface layer disposed on said second protective layer.

11. A medium according to claim 9, wherein said first and second protective layers contain a dielectric material.

12. A medium according to claim 10, wherein said surface layer contains a resin.

13. An information storage medium comprising:
a substrate; and
a recording layer supported on said substrate and subjected to reversible phase transformation between different phases by changing conditions under which a light beam is radiated, said recording layer containing an $(In_{100-x}Sb_x)_{100-y-z}Te_yAu_z$ alloy (wherein x, y, and z are in atomic % and $0.05 \leq y + z \leq 5$).

14. A medium according to claim 13, further comprising a first protective layer, interposed between said substrate and said recording layer, a second protective layer, disposed on said recording layer, and a surface layer disposed on said second protective layer.

15. A medium according to claim 14, wherein said first and second protective layers contain a dielectric material, and said surface layer contains a resin.

* * * * *